June 28, 1960  E. R. FILLEY  2,942,461
WELL BORE HOLE LOGGING
Filed Dec. 16, 1955
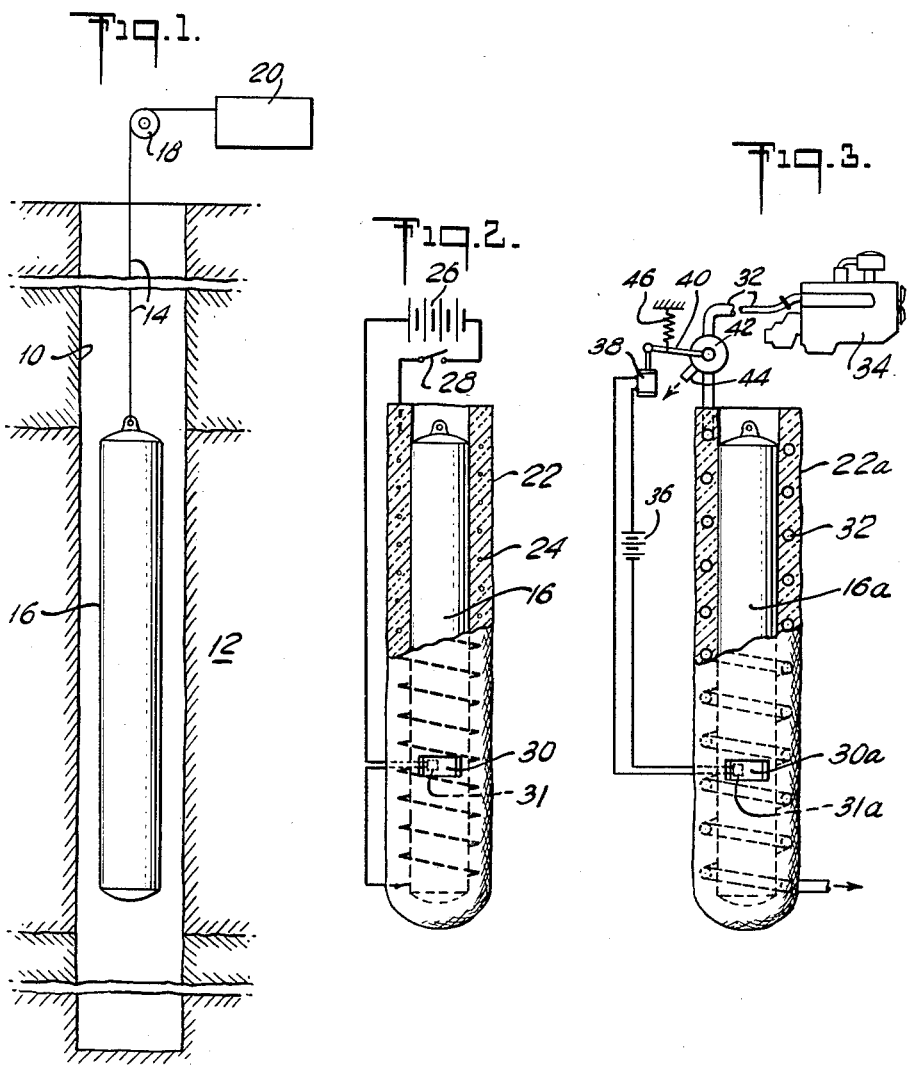

United States Patent Office 2,942,461
Patented June 28, 1960

2,942,461
WELL BORE HOLE LOGGING

Everett R. Filley, New York, N.Y., assignor to Texaco Inc., a corporation of Delaware Filed Dec. 16, 1955, Ser. No. 553,563

7 Claims. (Cl. 73—151)

This invention relates generally to well bore hole logging in which an instrument is passed through the bore hole, usually suspended from a cable or wire line, for determining the natures and locations of the formations traversed by the hole or for determining other characteristics of the formations or the bore hole itself such as the velocities of sound waves through the formations, the bottom hole pressure in the well, the inclination of the well from the vertical, etc. More particularly the invention relates to a method and apparatus for conditioning the instrument to be lowered into the well in such a manner that a maximum of accurate information will be obtained.

As is well known, instruments used for bore hole logging or for obtaining other information in a bore hole frequently comprise an elongated sealed housing or shell adapted to be attached to a cable, the housing usually containing various measuring devices, electronic circuits and other highly complex apparatus. It is also well known that the temperatures encountered in well bore holes usually vary from normal room temperature to much higher values and wherever possible the down-hole instrument is designed and calibrated so that it will function properly at the temperatures encountered in the bore hole.

As an example of one form of instrument which may be used in making measurements within a bore hole, a radioactivity well logging sonde may be mentioned. While there are many different types of these instruments, such a device usually contains a detector of penetrative radiation such as gamma rays, neutrons or the like, together with associated electronic equipment such as a preamplifier, scaling circuit, electrical power supply, etc. In some cases the instrument also contains a source of penetrative radiation such as radium, a radio-active isotope or mixtures of radium or polonium and beryllium and in these cases the detector is sensitive to some form of secondary radiation such as scattered gamma rays, scattered neutrons or gamma rays induced in the surrounding formations by bombardment of neutrons from the source. The radiation detectors may be in the form of Geiger-Mueller counters, ionization chambers, or proportional counters and recently the scintillation type of detector has come into use as a means for measuring the radiation. Not infrequently some of these instruments are adversely affected by abnormally low or high temperatures. The foregoing is given merely as examples of instruments designed to be passed through a bore hole and to show the complexity and intricate nature of some of the apparatus employed.

In connection with the use of many different types of down-hole instruments it is necessary that the device be accurately and carefully calibrated so that the resulting record will be an accurate indication of the characteristics of the subsurface formations or of the bore hole. By way of example, an instrument as described hereinabove for measuring either the natural gamma radiation or secondary radiation from the formations is frequently calibrated before it is run into the bore hole by placing a small source of radiation of known strength or intensity in a known or predetermined position with respect to the instrument while a reading is taken of the intensity of the radiation striking the detector. If the indicating or recording apparatus shows the proper value then the instrument can be placed in the hole and the logging operation started. If the instrument does not indicate the correct value or amount of radiation then it may be necessary to make some adjustment or even to replace some element contained within the housing.

In some instances the logging instrument is calibrated at the shop or laboratory and then transported to the well to be logged and in other instances the instrument is calibrated at the well. There have been many instances where due to geographical location, the season of the year, etc., the calibrating operation is done either at the well when the temperature is low or within a shop or laboratory at room temperature after which the instrument is transported to the well where low temperatures are prevailing. In either case the low temperature conditions adversely affect the instrument or its calibration so that the results of the log are inaccurate and sometimes unuseable. It is the purpose of this invention to provide a method and means whereby the calibration of the instrument can be made regardless of temperature and adverse weather conditions.

In accordance with the invention the down-hole instrument or at least that portion subject to temperature is heated to a predetermined amount either during transportation to the well or at the well for a period preceding the insertion of the instrument into the hole for the logging operation and the calibrating is done while he instrument is so heated.

For a better understanding of the invention reference may be had to the accompanying drawing in which:

Fig. 1 is a vertical sectional elevation through a portion of a well bore hole showing suspended therein an instrument to be used in a determination of the properties or characteristics of the surrounding earth formation or of conditions in the bore hole itself, or the like;

Fig. 2 is a vertical elevation partly in section showing electrical heating means encasing the instrument; and Fig. 3 is a view similar to Fig. 2 but showing means for heating the instrument with engine exhaust gases.

Referring to Fig. 1 of the drawing a bore hole 10 is shown as penetrating or traversing subsurface formations or zones, one of which is indicated at 12. Shown as suspended within the hole from a cable 14 is an instrument indicated generally by the elongated housing or shell 16 and as has been stated hereinabove, the instrument 16 may be one which is utilized in making a radioactivity log of the subsurface formations or it may be an instrument for making other types of bore hole logs, for determining the seismic wave velocities through the formations, for determining the inclination from the vertical of the bore hole itself, for measuring bottom hole pressures, and the like. The cable 14 passes over a suitable reel or drum 18 at the surface which serves to indicate or record the amount of cable payed out and thus the depth of the instrument in the bore hole at any time. From the reel 18 the cable shown as passing to a device 20 which may be an electronic amplifier and/or recording instrument by means of which a record is made in response to the output to whatever type of detecting device may be included within the instrument in the hole.

Assuming that the instrument 16 is to be used for making a natural gamma ray log of the subsurface formations it would contain a gamma ray detector responsive to the gamma rays naturally emitted in a formation such as that indicated at 12 and also a preamplifier, power supply and possibly other electronic apparatus. The device 20 would provide on a moving strip or tape a record of the variations in the output of the detector within the hole and thus a record of the variations in intensity of the gamma rays reaching the hole from the surrounding formations as the instrument 16 passes through the hole.

As stated above, an instrument such as that indicated at 16 is usually calibrated before the logging operation either at the surface before it is run into the hole or at the laboratory or shop after which it is transported to the bore hole. In the latter case the instrument may be subject to low temperature weather conditions during its transportation which may adversely affect the operation of some of the equipment within the instrument housing so that when the log is made it will not be a true indication of the nature of the formations surrounding the bore hole. Again, even if the instrument is calibrated at the surface immediately prior to running in the hole it may well be at a temperature which, due to weather conditions, is much lower than will be encountered by the instrument when in the bore hole and such a calibration will, of course, not be such as to show the operator that the instrument will perform satisfactorily when subject to the higher temperature within the bore hole.

In one form of the invention as is illustrated in Fig. 2, the instrument 16 is shown as surrounded by or encased within a boot 22 preferably of heat insulating material and in which is imbedded an electrical resistance element indicated by the wire 24. The ends of the resistance element are adapted to be connected to any suitable source of electrical supply such as the battery 26 through a suitable switch 28. A small portion 30 of the jacket or boot 22 is shown as removable or hinged so that it may be opened to permit the insertion of a suitable thermometer or other such device for indicating the temperature of the instrument 16. If desired, a thermostatic switch 31 of any suitable well-known type may be permanently mounted or disposed within the boot 22 so as to be responsive to the temperature of the instrument 16. In Fig. 2 the switch 31 is shown as connected in series with the electrical source 26 and the heating element 24. In a mannner well known the switch may be preset so as to open or close the heating circuit at any predetermined temperature. The removal or opening of the portion 30 also permits a calibration of the instrument. In the case of the example given, i.e., a natural gamma ray well logging instrument this calibration may be affected by placing a small source of radiation such as a small amount of radium or a radioactive isotope either against or in a known position with respect to the instrument shell 16 and preferably opposite that portion of the instrument containing the gamma ray detector.

In Fig. 3 the jacket 22a has imbedded therein or affixed thereto in any suitable manner a tube 32 adapted to be connected at one end to a source of warm gases such as the exhaust of an internal combustion engine 34. The apparatus including the jacket 22a, removable portion 30a, etc. is in other respects substantially the same as in the embodiment of Fig. 2. In the embodiment of Fig. 3 a thermostatic switch 31a is shown as connected in a circuit with an electrical source 36 and a suitable solenoid 38 adapted, through a linkage 40 to actuate a suitable two-way valve 42 in the line connecting the exhaust of the engine 34 to the heating tube 32 within the jacket 22a. It is understood that the valve 42 may be of any desired well-known type adapted to connect the exhaust gases from the engine either to the heating tube 32 or to atmosphere through the outlet 44. In the position shown in Fig. 3 the switch 31a is closed so that the exhaust gases can pass through the valve 42 from the engine to the upper end of the heating tube 32. When the temperature of the instrument 16a reaches the predetermined or desired value the switch 31a may open the circuit, thus de-energizing the solenoid 38 and permitting the spring 46 to move the valve slightly in a clockwise direction to connect the exhaust gases from the engine 34 to the atmosphere through the outlet 44. Thus the temperature of the instrument 16a can be maintained at any desired value.

In the situation where the instrument 16 is calibrated at the shop or laboratory, the boot 22 or 22a may be placed around the instrument either before or after the calibration and connected either to the electrical source 26 or the exhaust of the internal combustion engine 34 while being transported to the well to be logged. A thermometer or other temperature measuring device may be inserted under the removable portion 30 or 30a so that the operator may connect the jacket to the source of heat whenever it is thought necessary in order to maintain the proper temperature of the instrument. If the device is provided with one of the automatic temperature controls described hereinabove the desired temperature can be maintained automatically as previously set forth. In case the instrument is to be calibrated at the surface near the bore hole the jacket or boot will preferably be connected to one of the sources of heat for a time sufficient to bring the temperature of the instrument up to a predetermined value such as room temperature or a value equal to the average temperature to be encountered in the bore hole, for example.

It will be seen that a means has been provided which is simple in nature and yet which is very effective in controlling the temperature of an instrument to be passed through a bore hole so that a proper calibration can be made and which will assure the operator that the log or other measurement, when it is made, will be an accurate indication or measurement of the characteristic of the formations or bore hole which it is desired to ascertain.

Obviously many modifications and variations of the invention as hereinabove set forth may be made without departing from the spirit and scope thereof and therefore only such limitations should be imposed as are indicated in the appended claims.

I claim:

1. In combination with a logging instrument adapted to be passed through a well bore hole and the accuracy of which may vary with changes in temperature, a boot-like member of heat insulating material adapted to encase at least a portion of the instrument and means for applying heat to said member, whereby the encased instrument is adapted and arranged to be maintained at least at room temperature for a period preceding the insertion of the instrument into the bore hole for the logging operation.

2. The combination defined in claim 1 in which the heat applying means comprises an electrical resistance element imbedded in said insulating member, said element being adapted to be connected to a source of electrical supply.

3. The combination defined in claim 1 in which the heat applying means comprises a tubular member imbedded in said insulating boot and adapted to be connected to a source of warm gases such as the exhaust of an internal combustion engine.

4. The combination defined in claim 1 in which said insulating member is provided with a door-like portion adapted to be opened to permit calibration of said instrument.

5. The combination defined in claim 1 with means responsive to the temperature of said instrument for controlling the amount of heat applied thereto by said heat applying means.

6. For use in maintaining the temperature of a logging instrument adapted to be passed through a bore hole at least at room temperature for a period preceding the insertion of the instrument into the bore hole for a logging operation, the improvement comprising a boot-like member of heat insulating material adapted to encase at least a portion of the logging instrument, said boot-like member including means for supplying heat thereto including a tubular member imbedded in the insulating boot and adapted to be connected to a source of warm gases, valving means for controlling the flow of gas through said tubular member and means including a thermostat for controlling the operation of said valving means as a function of the temperature of the logging instrument whereby the instrument may be maintained under predetermined temperature conditions from the time it is calibrated until it is inserted into the bore hole.

7. The apparatus defined in claim 6 wherein the means for supplying heat to said boot-like member comprises the exhaust system of an internal combustion engine.

References Cited in the file of this patent

UNITED STATES PATENTS

| | | |
|---|---|---|
| 1,455,287 | Hadley | May 15, 1923 |
| 1,992,593 | Whitney | Feb. 26, 1935 |
| 2,167,630 | Bazzoni et al. | Aug. 1, 1939 |
| 2,433,554 | Herzog | Dec. 30, 1947 |
| 2,671,323 | Richert | Mar. 9, 1954 |
| 2,711,084 | Bergan | June 21, 1955 |